UNITED STATES PATENT OFFICE.

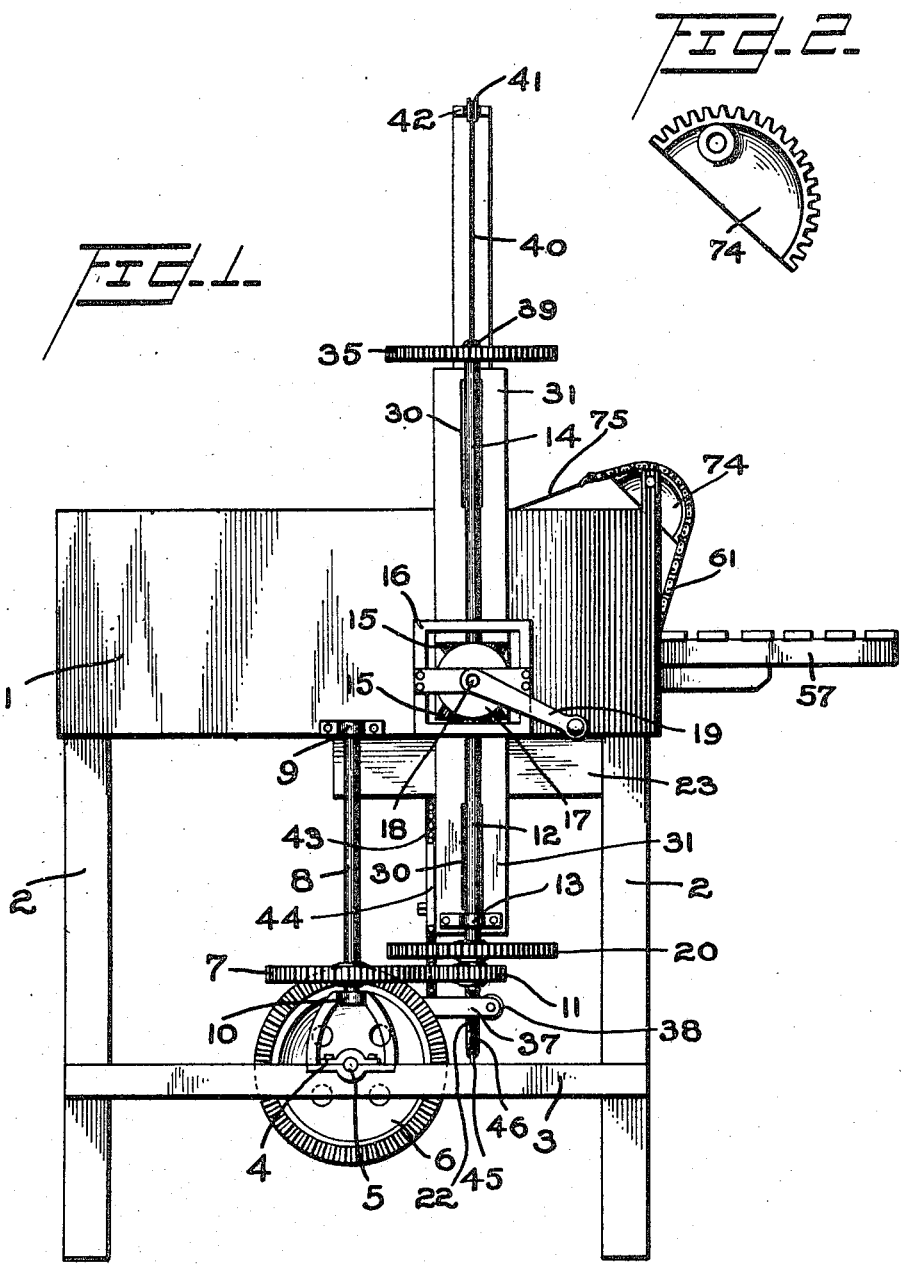

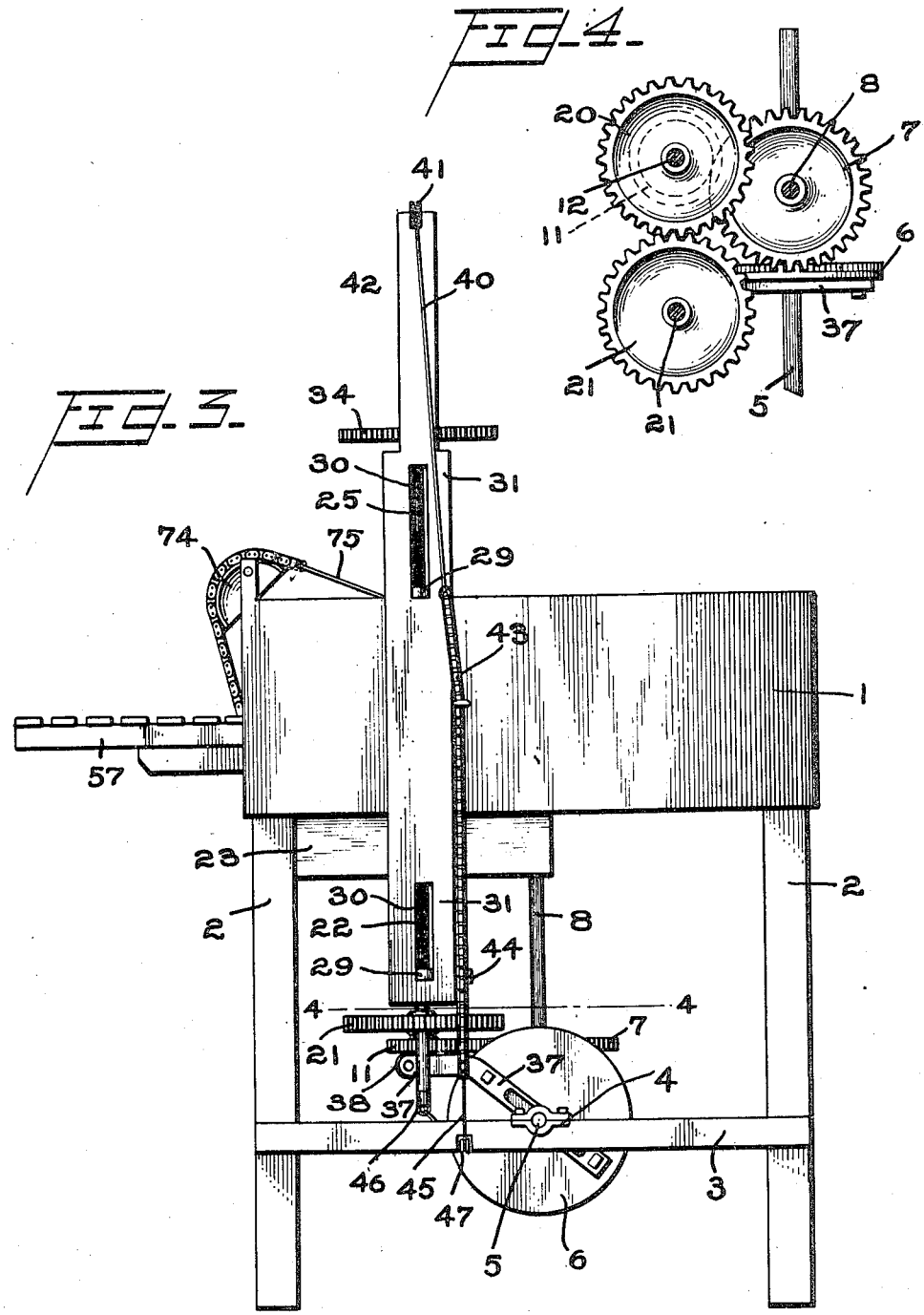

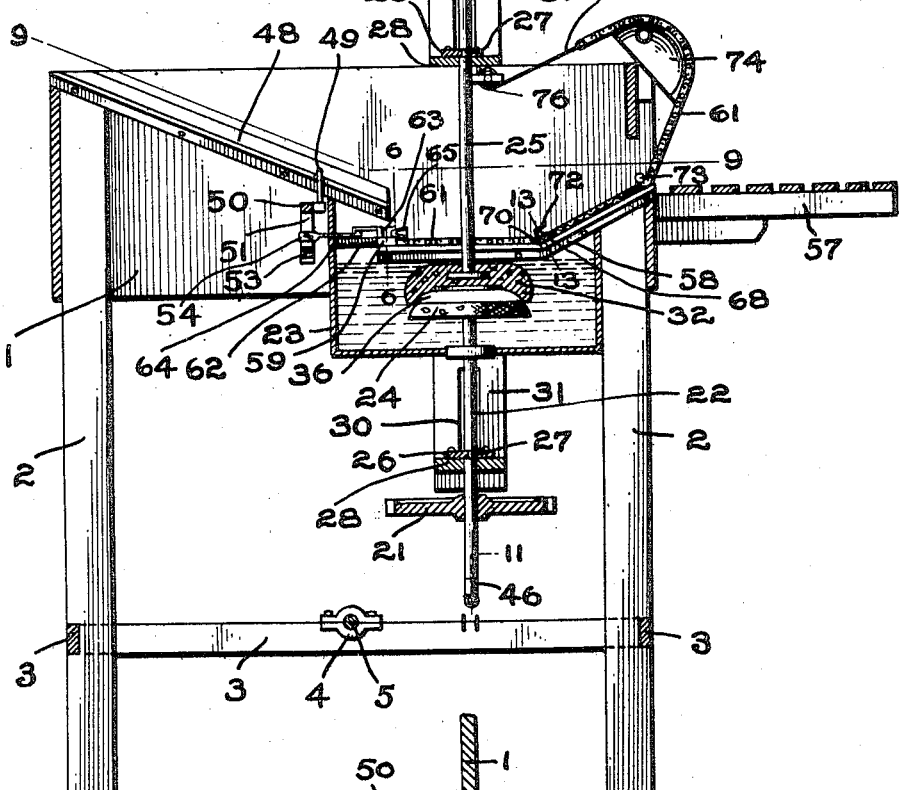

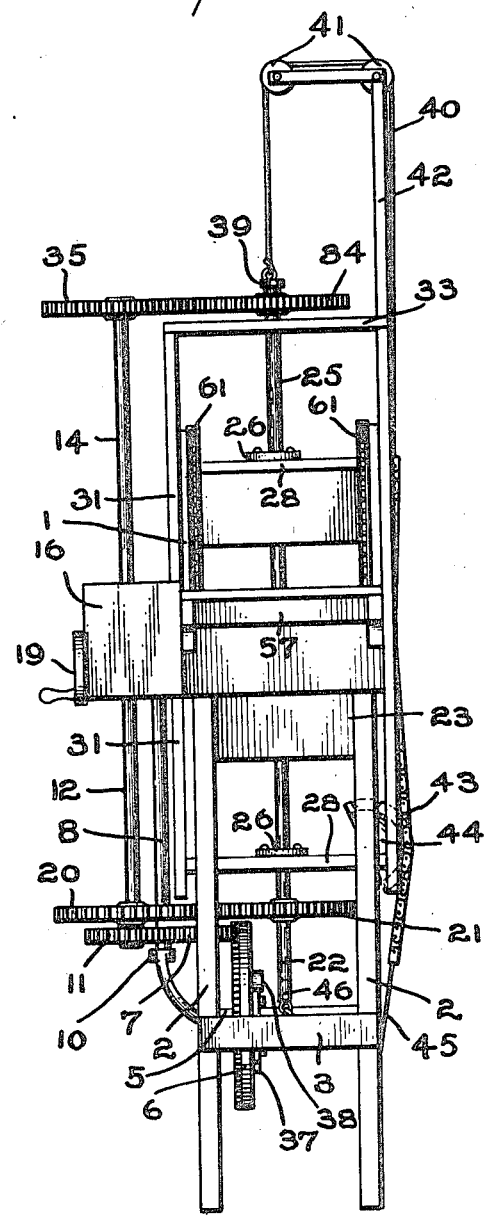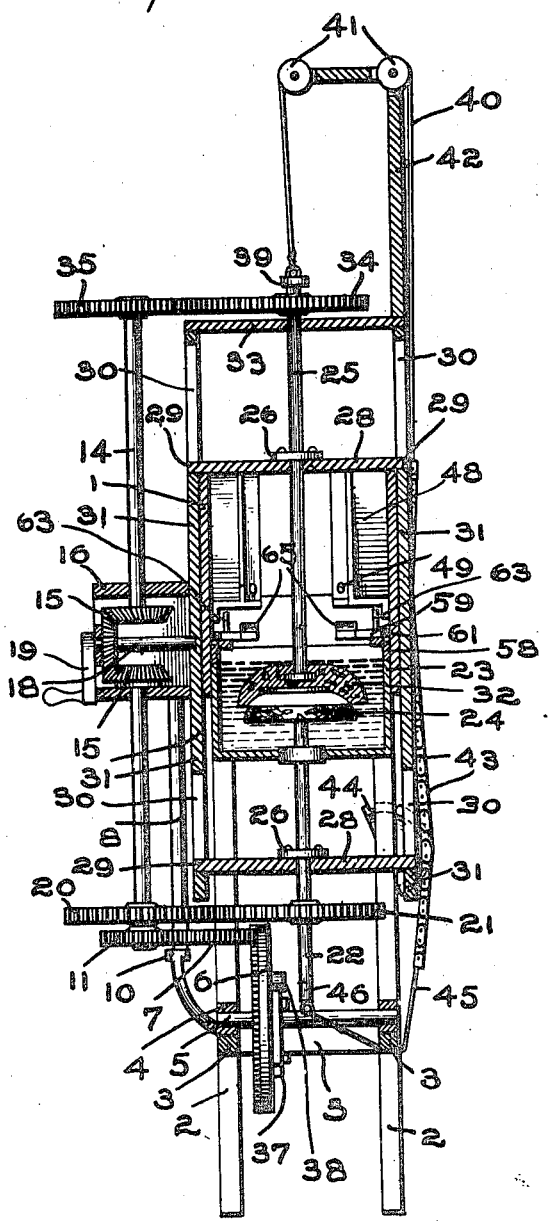

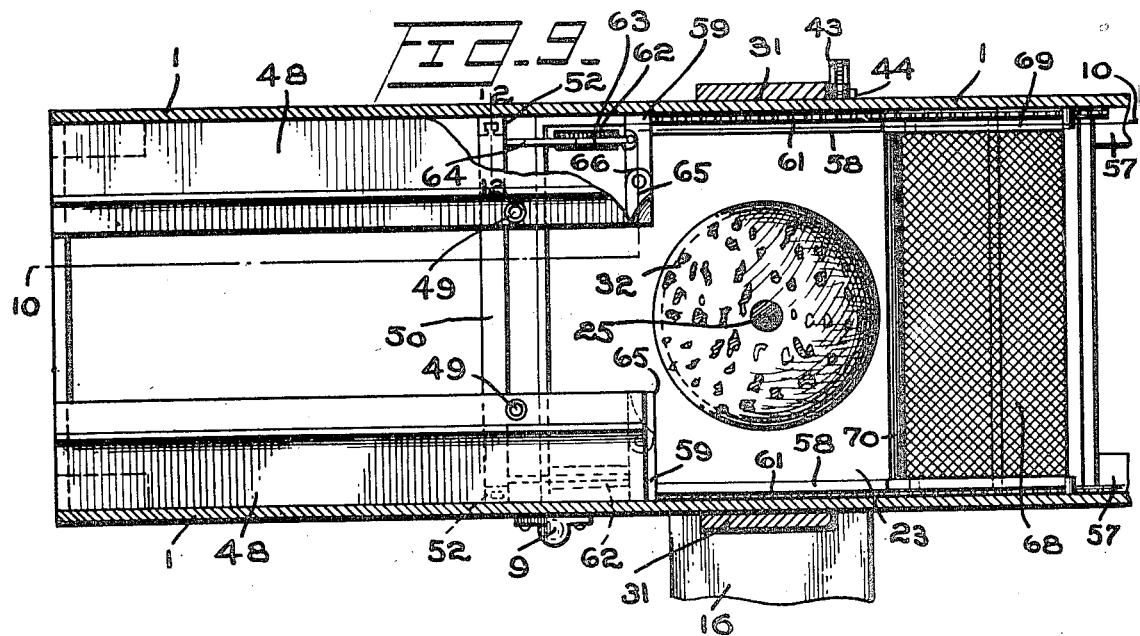
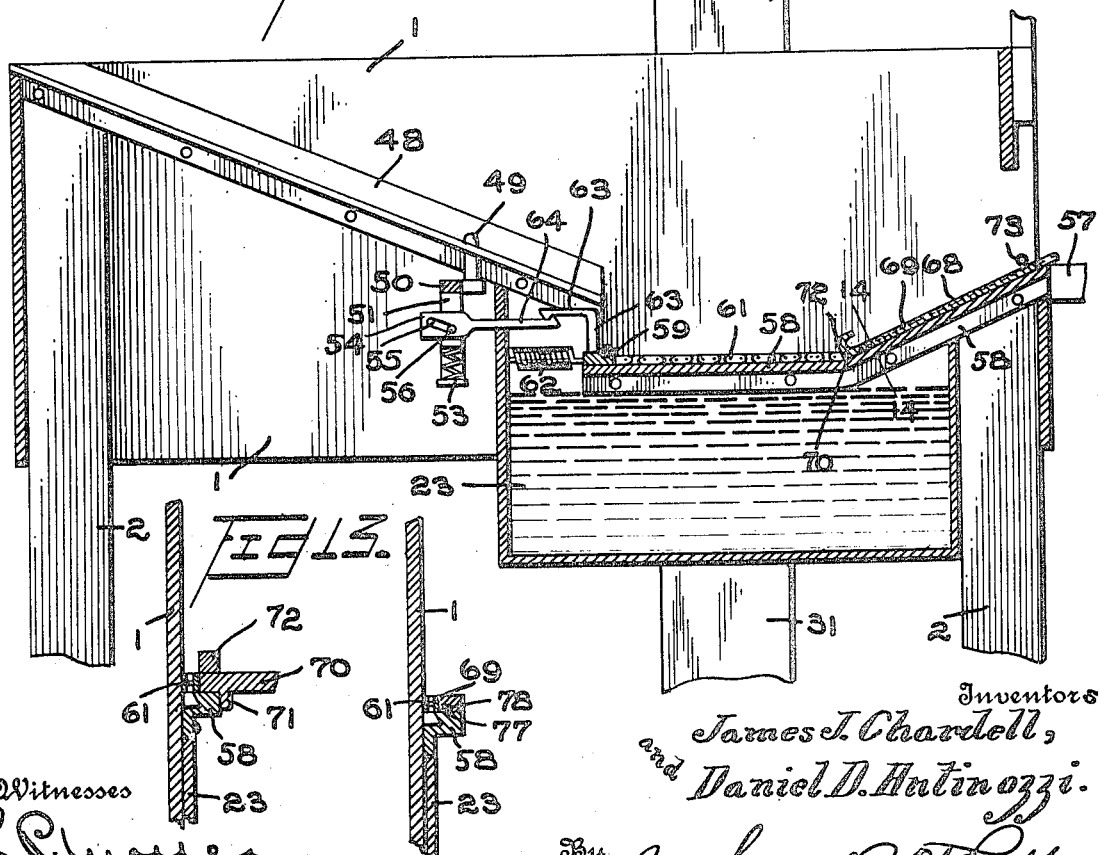

JAMES J. CHARDELL AND DANIEL D. ANTINOZZI, OF HAZLETON, PENNSYLVANIA.

DISH-WASHING MACHINE.

1,070,012.  Specification of Letters Patent.  Patented Aug. 12, 1913.

Application filed February 20, 1913. Serial No. 749,669.

*To all whom it may concern:*

Be it known that we, JAMES J. CHARDELL and DANIEL D. ANTINOZZI, citizens of the United States, residing at Hazleton, in the county of Luzerne and State of Pennsylvania, have invented certain new and useful Improvements in Dish-Washing Machines, of which the following is a specification.

Our invention relates to improvements in dish washing machines, the object of the invention being to provide improved mechanism for automatically washing a plate or dish, and then carrying the plate or dish out of the washing tank onto a delivery platform.

A further object is to provide an improved dish washing machine which automatically permits the dishes to fall into operative position between two sponges or other washing means, and which, at the proper time, separates the sponges, removes the washed plate, and permits a dirty plate to fall into place to be washed.

A further object is to provide an improved dish washing machine which is entirely automatic in its operation, and which, through the medium of a continuously turning driving gear, transmits motion to the several mechanisms, whereby the plates are washed and delivered, hence simply requiring the attention of some one to supply the plates and another to remove them.

With these and other objects in view, the invention consists in certain novel features of construction and combinations and arrangements of parts as will be more fully hereinafter described and pointed out in the claims.

In the accompanying drawings: Figure 1 is a view in side elevation illustrating our improvements. Fig. 2 is a view of one of the segmental ratchet cams. Fig. 3 is a view in elevation of the opposite side of the machine. Fig. 4 is a view in section on the line 4—4 of Fig. 3. Fig. 5 is a view in vertical longitudinal section. Fig. 6 is a fragmentary view in section on an enlarged scale on the line 6—6 of Fig. 5. Fig. 7 is an end elevation of the machine. Fig. 8 is a view in vertical transverse section. Fig. 9 is a sectional plan view on an enlarged scale on the line 9—9 of Fig. 5 showing parts broken away to illustrate parts below. Fig. 10 is a view in vertical section on the staggered line 10—10 of Fig. 9. Fig. 11 is a fragmentary view in section on the line 11—11 of Fig. 5. Fig. 12 is a fragmentary view in section on the line 12—12 of Fig. 9. Fig. 13 is a fragmentary view in section on the line 13—13 of Fig. 5, and Fig. 14 is a fragmentary view in section on the line 14—14 of Fig. 10.

1 represents a rectangular casing open at top and bottom and supported by legs 2, the latter connected by transverse bars 3 as clearly shown. On the bars 3, bearings 4 are located and support a horizontal shaft 5. A face gear 6 is secured on shaft 5 and meshes with a gear 7 secured to a shaft 8, the latter vertically disposed and supported in bearings 9 and 10, respectively, the former secured to casing 1 and the latter supported on a cross bar 3. Gear 7 is driven by a pinion 11 on a driving shaft 12, the latter supported in bearings 13 and in line with a second driving shaft 14. These driving shafts have beveled gears 15 at their adjacent ends supported in a boxing 16, and driven by a beveled gear 17 on a stub 18 also mounted in said boxing. This stub 18 has a crank arm 19, so that it may be manually revolved or may be driven in any other approved way.

On shaft 12, above pinion 11, a gear 20 is secured and meshes with a gear 21 on a vertical shaft 22. This shaft 22 extends up through the bottom of a washing tank 23 and on its upper end, a sponge 24 is secured in any approved manner. In line with shaft 22 and directly above the shaft, is a shaft 25. These shafts 22 and 25 are connected by collars 26 located in grooves 27 with cross bars 28, and these cross bars 28 have reduced ends 29 which move in longitudinal slots 30 in boards 31 secured to the sides of casing 1 and extending above and below the same as clearly shown. The upper shaft 25 is provided at its lower end with a sponge or similar cleaning device 32, and at its upper end projects through a fixed cross bar 33. A gear 34 secured to the shaft 25 is driven by a gear 35 on the shaft 14 above referred to, so that when the crank arm 19 is turned, shafts 25 and 22 will be revolved in opposite directions to thoroughly clean a plate 36.

It is to be understood, of course, that the tank 23 will contain a cleansing liquid, preferably soapy water, to the necessary level, and that the sponges with their plate are normally below the level of water, but are elevated as will be hereinafter explained.

On gear wheel 6, a crank arm 37 is adjustably secured and carries at its free end, a roller 38 which is adapted to engage under a gear 21 so that at each complete revolution of gear 6, the gear 21 and its shaft 22 will be elevated to raise the sponges and the dish above the level in tank 23. As it is necessary to raise the shaft 25 a distance greater than such movement imparted to shaft 22 in order to lift the upper sponge away from the plate, the following mechanism is provided: A coupling 39 is swiveled to the upper end of shaft 25, and is connected to a cable 40. This cable 40 is passed over pulleys 41 at the upper end of an extension 42 on one of the boards 31. This cable 40 is secured to one end of a sprocket chain 43, and said sprocket chain engages the outer surface of a segmental sprocket cam 44. The lower end of said chain 43 is connected by a cable 45 with a coupling 46 on the lower end of shaft 22, and is passed under a pulley 47 on one of the cross bars 3. It will thus be seen that when the lower shaft 22 is elevated, that through the medium of the flexible connection above described, the upper shaft 25 will be elevated, but the movement of the upper shaft will be augmented by the action of the ratchet cam 44, and will be caused to swing on its pivot, and hence compel the flexible chain 43 to bow outwardly which will increase the movement of shaft 25 sufficiently to allow a plate to be removed and replaced by another.

At one end of the casing 1, and to the sides thereof, plate guides 48 are secured and incline so as to direct the plates downwardly into tank 23, but their downward movement is stopped by pins 49 which project into the path of movement of the plates. These pins are carried by a transverse bar 50, which latter is provided at its ends with downwardly projecting blocks 51 which have dove-tailed mortise and tenon connection with guides 52 secured to the walls of the casing so that the vertical movement of the bar 50 and pins 49 is directed. Coiled springs 53 exert upward pressure on the blocks 51 to normally hold the pins 49 in elevated position, and these pins are drawn downwardly by longitudinally movable links 54. The links 54 have inclined slots 55 therein which receive pins 56 on blocks 51, so that when the links 54 are moved to the right of Fig. 10, they will pull the pins 49 to allow a plate to move into the tank.

To the sides of casing 1, and extending from the tank 23 to a platform 57 at one end of the casing, guides 58 are secured. These guides 58 support blocks 59, and the latter have tenons 60 which slide in the guides. The blocks 59 are secured to the lower ends of sprocket chains 61, and are connected by coiled springs 62 with the end wall of tank 23 to normally hold the blocks in the position shown in the drawings. These blocks 59 are provided with beveled spring catches 63 which are adapted to engage the beveled ends 64 of links 54, so that when the blocks are moved toward platform 57, their first operation will be to move the links 54 in a direction to pull down pins 49. When these links 54 reach the limit of their movement, the spring catches 63 will ride off the beveled end 64, and on the return movement will move into operative engagement as indicated because of the inherent elasticity of the spring catches.

The blocks 59 carry pivoted plate engaging fingers 65. These fingers 65 are preferably of rubber or surfaced with rubber, and at their free ends are recessed to receive the edge of the plate in said recess. The fingers 65 are free to swing in one direction, but movement in the opposite direction is prevented by contacting shoulders 66 as indicated in Fig. 9. Springs 67 normally hold the fingers 65 in the position indicated and return them to such position after they have passed a plate on their return movement.

A movable carrier 68 is adapted to slide on the guides 58 and comprises a rectangular frame 69 preferably filled by a netting as indicated. The lower bar 70 of the frame 69 is preferably surfaced with rubber or other friction material to prevent any slipping of the plate when the latter is in position thereon. This bar 70, adjacent its ends, is provided with lugs 71 which move inside of the guides 58 and prevent lateral movement of the carrier.

The bar 70 on its upper face, at its ends, is provided with hooks 72 which are adapted to engage small rollers 73 secured to casing 1, and limit the outward movement of the carrier. The chains 61 also pass under the rollers 73, and around segmental sprocket cams 74. The outer ends of these chains 61 are secured to cables 75 which pass around pulleys 76 and are secured to the upper transverse bar 28, so that when the shaft 25 is elevated, a longitudinal pull is had upon the chains 61.

It is, of course, to be understood that the operation is so timed that after a plate is washed, it will be elevated through the medium of the mechanism above described to a position above the level of the water in tank 23. This movement of the shafts 22 and 25 will exert a pull on the chains 61. The first movement of the chains will draw the blocks 59 along the guides 58, so that the fingers 65 will engage the plate 36 and force the latter onto the carrier 68, the rubber faced bar 70 preventing any retrograde slipping of the plates. This movement of the blocks 59 also pulls the pins 49 downwardly to allow a plate on guide 48 to fall into position on the lower sponge 24. As the chains 61 continue to draw outwardly, the blocks 59 will engage bar 70, and move the carrier 68 outwardly. Due to the weight of the plate and also the weight of the carrier, the free or outer edge of said carrier will move out onto the platform 57, such movement being limited by the rollers 73 with which the hooks 72 come into contact. The washed plate will then be in convenient reach for removal, and as the apparatus continues to move, the springs 62 will return the parts to normal position. The pivotal movement of the fingers 65 will allow them to return to normal position, past the plate to be washed, because they pivot in a direction to allow such movement.

To compel the carrier to return to normal position, lugs 77 are provided on chains 61 which engage shoulders 78 on the end members of frame 69 as clearly shown in Fig. 14.

While we have referred to the cleaning devices as sponges, we would have it understood that the invention is not limited to sponges, nor to any particular shape of plates, but the apparatus is capable of a wide range of usefulness, and various slight changes might be made in the general form and arrangement of parts described without departing from our invention, and hence we do not limit ourselves to the precise details set forth, but consider ourselves at liberty to make such changes and alterations as fairly fall within the spirit and scope of the appended claims.

Having thus described our invention, what we claim as new and desire to secure by Letters Patent is:

1. A dish washing machine comprising a tank, two alined shafts projecting into the tank, dish cleaning means on the adjacent ends of said shafts, means for revolving the shafts in opposite directions, and means for moving the shafts longitudinally, substantially as described.

2. A dish washing machine comprising a tank, two alined shafts projecting into the tank, dish cleaning means on the adjacent ends of said shafts, means for revolving the shafts in opposite directions, and means for moving both shafts in the same direction longitudinally, said means compelling one of said shafts to move a greater distance than the other of said shafts, whereby the cleaning means are separated, substantially as described.

3. A dish washing machine comprising a tank, two alined shafts projecting into the tank, dish cleaning means on the adjacent ends of said shafts, means for revolving the shafts in opposite directions, means for moving the shafts longitudinally, means directing a plate into position between the cleaning means, and means for removing a plate from between the cleaning means, substantially as described.

4. A dish washing machine comprising a tank, two alined shafts projecting into the tank, dish cleaning means on the adjacent ends of said shafts, means for revolving the shafts in opposite directions, means for moving both shafts in the same direction longitudinally, said means compelling one of said shafts to move a greater distance than the other of said shafts, whereby the cleaning means are separated, means directing a plate into position between the cleaning means, and means for removing a plate from between the cleaning means, substantially as described.

5. A dish washing machine comprising a tank, two alined shafts projecting into the tank, dish cleaning means on the adjacent ends of said shafts, means for revolving the shafts in opposite directions, means for moving the shafts longitudinally, and means operated by the longitudinal movement of the shafts to move a dish from between the cleaning means, substantially as described.

6. A dish washing machine comprising a tank, two alined shafts projecting into the tank, dish cleaning means on the adjacent ends of said shafts, means for revolving the shafts in opposite directions, means for moving both shafts in the same direction longitudinally, said means compelling one of said shafts to move a greater distance than the other of said shafts, whereby the cleaning means are separated, and means operated by the longitudinal movement of the shafts to move a dish from between the cleaning means, substantially as described.

7. A dish washing machine comprising a tank, two alined shafts projecting into the tank, dish cleaning means on the adjacent ends of said shafts, means for revolving the shafts in opposite directions, means for moving the shafts longitudinally, means directing a plate into position between the cleaning means, means operative by the longitudinal movement of the shaft for removing a plate from between the cleaning means, and a single driving shaft operating all of said operative means, substantially as described.

8. A dish washing machine comprising a tank, two alined shafts projecting into the tank, dish cleaning means on the adjacent ends of said shafts, means for revolving the shafts in opposite directions, means for moving both shafts in the same direction longitudinally, said means compelling one of said shafts to move a greater distance than the other of said shafts, whereby the cleaning means are separated, means directing a plate into position between the cleaning means, means operative by the longitudinal movement of the shaft for removing a plate from between the cleaning means, and a single driving shaft operating all of said operative means, substantially as described.

9. A dish washing machine, comprising a casing, a tank in the casing, two alined shafts having their adjacent ends in the tank, dish cleaning devices on the ends of said shafts, means for moving the shafts vertically and compelling the upper shaft to move a greater distance than the lower shaft, inclined guides in the casing, a movable carrier on the inclined guides, and means constructed to force a plate from between the cleaning devices onto the carrier, substantially as described.

10. A dish washing machine, comprising a casing, a tank in the casing, two alined shafts having their adjacent ends in the tank, dish cleaning devices on the ends of said shafts, means for moving the shafts vertically and compelling the upper shaft to move a greater distance than the lower shaft, inclined guides in the casing, a movable carrier on the inclined guides, blocks movable on the guides, chains moving the blocks and movable with the shafts, and pivoted fingers on said blocks adapted to engage a plate and force the same onto the carrier, substantially as described.

11. A dish washing machine, comprising a casing, a tank in the casing, two alined shafts having their adjacent ends in the tank, dish cleaning devices on the ends of said shafts, means for moving the shafts vertically and compelling the upper shaft to move a greater distance than the lower shaft, inclined guides in the casing, a movable carrier on the inclined guides, blocks movable on the guides, chains moving the blocks and movable with the shafts, pivoted fingers on said blocks adapted to engage a plate and force the same onto the carrier, inclined guides directing the plates into position between the cleaning devices, means for holding back the plates on said last-mentioned guide, and said last-mentioned plate holding means operated by the movement of the said blocks to release the plates and allow a plate to move into position between the cleaning devices, substantially as described.

12. A dish washing machine, comprising a casing, a liquid containing tank in the casing, vertical alined shafts projecting into the casing, dish washing devices on the ends of said shafts in the tank, and flexible devices connecting the upper end of the upper shaft with the lower end of the lower shaft, a cam engaged and moved by said flexible device, and means for moving said shafts vertically, substantially as described.

13. A dish washing machine, comprising a casing, a tank in the casing, uprights secured to the outside of the casing, vertical alined shafts in the casing having their adjacent ends projecting into the tank, dish cleaning devices on the adjacent ends of said shafts, uprights on the casing having longitudinal slots therein, cross bars having sliding movement in said slots and connected to said shafts, a driving gear on the lower shaft, a coupling having swiveled connection to the upper shaft, a second coupling having swiveled connection to the lower shaft, a flexible device connecting said couplings, a cam engaged by said flexible device, and a crank arm adapted to engage the said gear and impart a vertical movement to said shafts, substantially as described.

14. A dish washing machine, comprising a casing, a tank in the casing, uprights secured to the outside of the casing, vertical alined shafts in the casing having their adjacent ends projecting into the tank, dish cleaning devices on the adjacent ends of said shafts, uprights on the casing having longitudinal slots therein, cross bars having sliding movement in said slots and connected to said shafts, a driving gear on the lower shaft, a coupling having swiveled connection to the upper shaft, a second coupling having swiveled connection to the lower shaft, a flexible device connecting said couplings, a cam engaged by said flexible device, a crank arm adapted to engage the said gear and impart a vertical movement to said shafts, a dish removing device in the tank, flexible devices secured to move longitudinally with the upper shaft and operating said dish removing device, and cams over which said flexible devices are moved to augment the movement of the dish removing device when the shafts are moved longitudinally, substantially as described.

In testimony whereof we have signed our names to this specification in the presence of two subscribing witnesses.

JAMES J. CHARDELL.
DANIEL D. ANTINOZZI.

Witnesses:
  NICK ST. MARY,
  L. J. FERDINAND.